(12) United States Patent
Gormley (10) Patent No.: US 9,945,324 B2
(45) Date of Patent: Apr. 17, 2018

(54) SLEEVE LINKAGE FOR THRUST REVERSER

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 215 days.

(21) Appl. No.: 14/535,028

(22) Filed: Nov. 6, 2014

(65) Prior Publication Data

US 2016/0131078 A1 May 12, 2016

(51) Int. Cl.
*F02K 1/72* (2006.01)
*F02K 1/76* (2006.01)
*F02K 3/06* (2006.01)
*F02K 1/70* (2006.01)

(52) U.S. Cl.
CPC .............. *F02K 1/763* (2013.01); *F02K 1/70* (2013.01); *F02K 1/72* (2013.01); *F02K 3/06* (2013.01); *F05D 2220/323* (2013.01); *F05D 2250/41* (2013.01); *F05D 2260/57* (2013.01)

(58) Field of Classification Search
CPC ... F02K 1/70; F02K 1/763; F02K 1/72; F02K 3/06; F02K 1/54; F02K 1/56; F02K 1/62; F02K 1/625; F02K 1/64; F05D 2220/323; F05D 2250/41; F05D 2260/57
See application file for complete search history.

(56) References Cited

U.S. PATENT DOCUMENTS

| 3,621,763 | A | 11/1971 | Geyer |
| 6,036,238 | A | 3/2000 | Lallament |
| 6,170,254 | B1 | 1/2001 | Cariola |
| 6,340,135 | B1 | 1/2002 | Barton |
| 6,845,946 | B2 | 1/2005 | Lair |
| 6,895,742 | B2 | 5/2005 | Lair |
| 7,146,796 | B2 | 12/2006 | Lair |
| 7,264,203 | B2 | 9/2007 | Lair |
| 7,513,101 | B2 | 4/2009 | Eschborn |
| 2004/0068978 | A1* | 4/2004 | Lair et al. ................. F02K 1/70 60/226.2 |
| 2009/0188233 | A1 | 7/2009 | Vauchel et al. |
| 2010/0072324 | A1 | 3/2010 | Teulou |
| 2011/0167790 | A1 | 7/2011 | Cloft |
| 2012/0193448 | A1* | 8/2012 | Caruel ...................... F02K 1/72 239/265.29 |

(Continued)

FOREIGN PATENT DOCUMENTS

EP 0801221 10/1997
FR 2987080 A1 * 8/2013 ............... F02K 1/72

OTHER PUBLICATIONS

EP search report for EP15193426.2 dated Apr. 6, 2016.

*Primary Examiner* — Pascal M Bui Pho
*Assistant Examiner* — Kyle Thomas
(74) *Attorney, Agent, or Firm* — O'Shea Getz P.C.

(57) ABSTRACT

Aspects of the disclosure are directed to a system for a thrust reverser of an aircraft comprising: a primary sleeve, and a secondary sleeve, wherein a first stroke associated with the primary sleeve is different from a second stroke associated with the secondary sleeve, and wherein the primary sleeve traverses a first distance associated with the first stroke at the outset of a deployment of the thrust reverser and a second distance associated with the first stroke at a later stage of the deployment.

13 Claims, 9 Drawing Sheets

(56) References Cited

U.S. PATENT DOCUMENTS

| | | | |
|---|---|---|---|
| 2013/0025259 A1* | 1/2013 | Beardsley | F02K 1/72 60/226.2 |
| 2013/0160425 A1 | 6/2013 | Scanlon | |
| 2013/0186219 A1 | 7/2013 | Jones | |
| 2013/0228635 A1 | 9/2013 | Caruel | |
| 2013/0318945 A1 | 12/2013 | Todorovic | |
| 2014/0150403 A1* | 6/2014 | Stuart | F02K 1/72 60/204 |
| 2015/0267643 A1* | 9/2015 | Gonidec et al. | F02K 1/72 239/265.33 |

* cited by examiner

SLEEVE LINKAGE FOR THRUST REVERSER

BACKGROUND

Figure 1A:
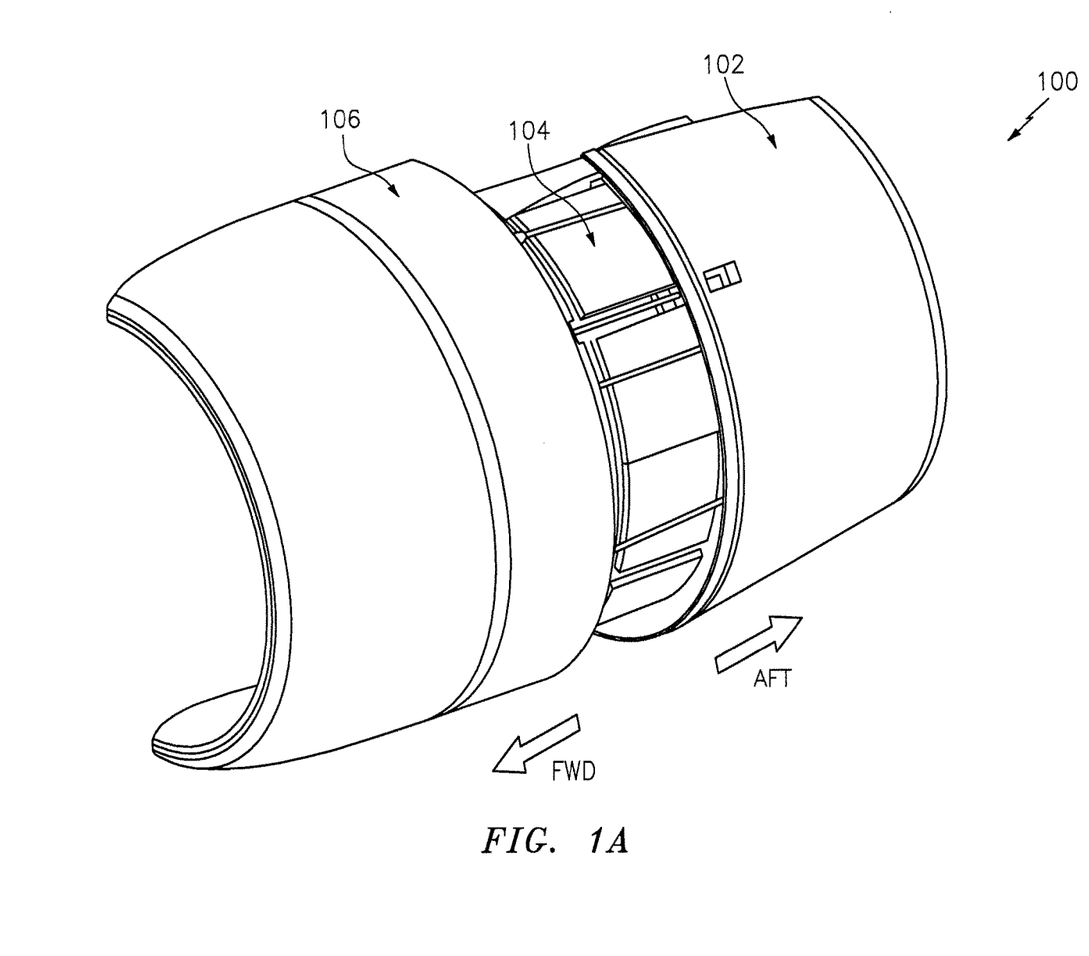
FIG. 1A illustrates a thrust reverser system incorporating a translating sleeve.
Figure 4:
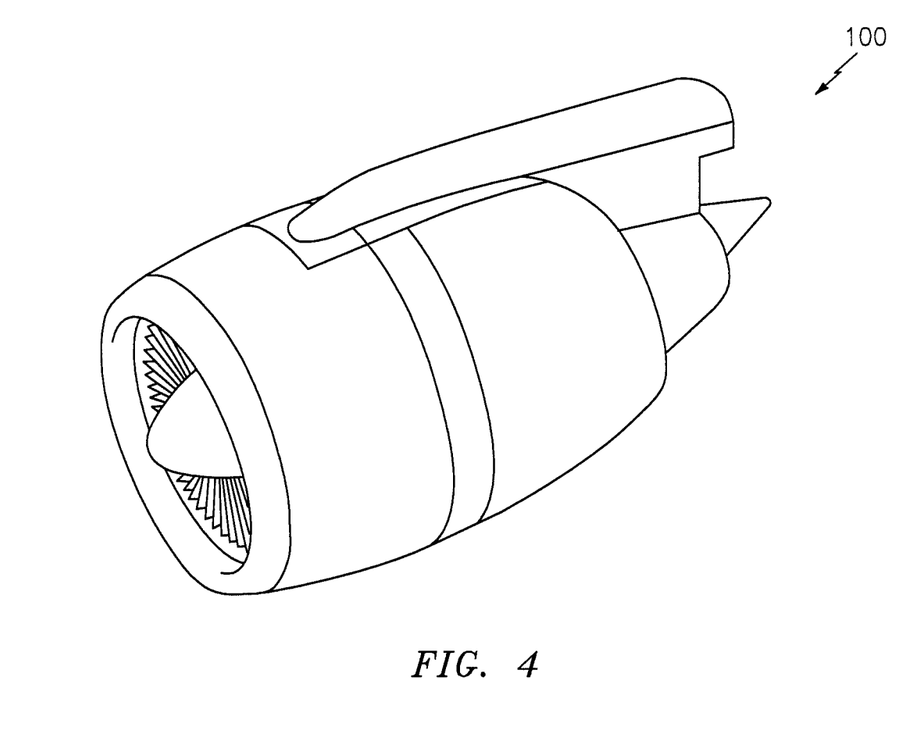
FIG. 4 illustrates a nacelle incorporating a thrust reverser.

Within a turbo fan engine that utilizes a cascade type thrust reverser, there are typically a plurality of blocker doors that deploy in order to redirect engine bypass air thru a set of cascades that redirect the airflow out and forward in order to reverse the direction of the thrust of the engine. This may be done to slow an aircraft after landing. Referring to FIG. 1A, a system 100 is shown. The system 100 includes a sleeve 102 that is translated or moved in, e.g., an aft direction in order to expose cascades 104 as part of the deployment of the thrust reverser. Similarly, in order to place the thrust reverser in a stowed state (e.g., during flight) the sleeve 102 is translated or moved in, e.g., a forward (FWD) direction, such that the sleeve 102 may contact or abut a nacelle structure 106. When in the stowed state, the cascades 104 are not exposed. FIG. 4 illustrates the system 100 in the stowed state. An entirety of a nacelle is shown in FIG. 4, whereas a portion (e.g., a half) of the nacelle is shown in FIG. 1A.

Figure 1B:
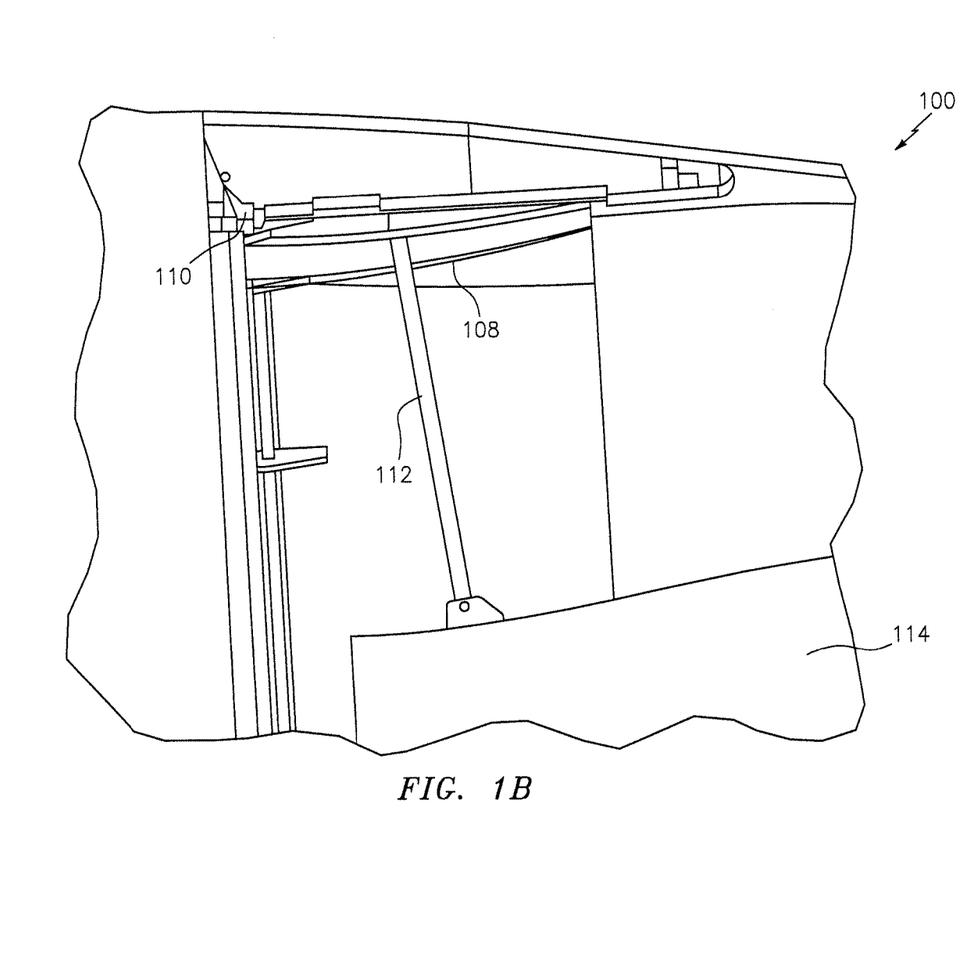
FIG. 1B illustrates a drag link of the system of FIG. 1A.

FIG. 1B illustrates a blocker door 108 of the system 100 hinged to the sleeve 102 near a point 110. Additionally, the door 108 is attached to the inner fixed structure 114 of the thrust reverser via a drag link 112 that retains the door 108 in position during normal flight as well as aids in the deployment of the door 108 during thrust reverse mode. During flight, the door 108 forms, in part, the outer surface of a bypass duct. The drag link 112 crosses this bypass duct in attaching to the inner fixed structure.

New configurations for a thrust reverser have been proposed which represent improvements over the basic, common configuration illustrated in FIGS. 1A and 1B. Some of these new configurations feature a first and second movable structure that must each be moved during thrust reverser deployment at different rates of movement. For example, in co-pending patent application Ser. No. 14/534,988 filed Nov. 6, 2014, a thrust reverser is proposed with a primary and secondary sleeve each of which slides in a fore and aft direction, and each of which requires a different range of motion or stroke, and different actuation rates. It would be possible to include two separate thrust reverser actuation systems which each independently actuate the primary and the secondary sleeve. However, such an arrangement might be heavier and costlier and less optimal in other respects, too. This disclosure proposes a way to link the deployment of two (or possibly more) components, such as a primary and secondary sleeve, so that their deployment can be linked and coordinated and may be accomplished with a single thrust reverser actuation system. Of course, in addition to the specific embodiments disclosed in patent application Ser. No. 14/534,988, there are other embodiments of thrust reversers which would also benefit from this capability.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system for a thrust reverser of an aircraft comprising: a primary sleeve, and a secondary sleeve, wherein a first stroke associated with the primary sleeve is different from a second stroke associated with the secondary sleeve, and wherein the primary sleeve traverses a first distance associated with the first stroke at the outset of a deployment of the thrust reverser and a second distance associated with the first stroke at a later stage of the deployment. In some embodiments, the first distance is greater than the second distance. In some embodiments, the system further comprises at least one actuator configured to drive at least one of the primary sleeve and the secondary sleeve. In some embodiments, the primary sleeve is coupled to the secondary sleeve, and the at least one actuator is configured to drive the secondary sleeve in order to cause an actuation of the primary sleeve. In some embodiments, the primary sleeve is coupled to the secondary sleeve via a plurality of four-bar mechanisms arranged in series. In some embodiments, the plurality of four-bar mechanisms comprises: a first four-bar mechanism comprising: the secondary sleeve, a second link coupled to the secondary sleeve, a first link coupled to the second link, and a first fixed structure coupled to the first link, a second four-bar mechanism comprising: the first link, a third link coupled to the first link, a second fixed structure coupled to the third link, and the primary sleeve coupled to the second fixed structure. In some embodiments, the first fixed structure comprises at least one of a clevis and a beam. In some embodiments, the second fixed structure comprises at least one of a clevis and a bond panel. In some embodiments, the at least one actuator comprises a first actuator configured to drive the primary sleeve and a second actuator that is configured to drive the secondary sleeve.

Aspects of the disclosure are directed to a kinematic mechanism for actuating a thrust reverser, comprising: a clevis coupled to fixed structure, and at least one link pivotally coupled to the clevis, wherein the at least one link couples a primary sleeve and a secondary sleeve. In some embodiments, the at least one link comprises a plurality of links. In some embodiments, the kinematic mechanism is configured to cause the primary sleeve to traverse a first distance at the outset of a deployment of the thrust reverser and a second distance at a later stage of the deployment. In some embodiments, the kinematic mechanism further comprises at least one actuator configured to drive at least one of the primary sleeve and the secondary sleeve. In some embodiments, the at least one actuator is configured to drive the secondary sleeve in order to cause an actuation of the primary sleeve.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for making and using a translating cascade thrust reverser. In some embodiments, a translating/primary sleeve may operate separate/independent from a translating cascade, potentially without the use of separate actuation or a duplicate thrust reverser actuation system (TRAS). By doing so, the sleeve and the cascade can be operated at different speeds and different distances. As used herein, a stroke refers to the distance that a respective element may traverse.

Figure 2A:
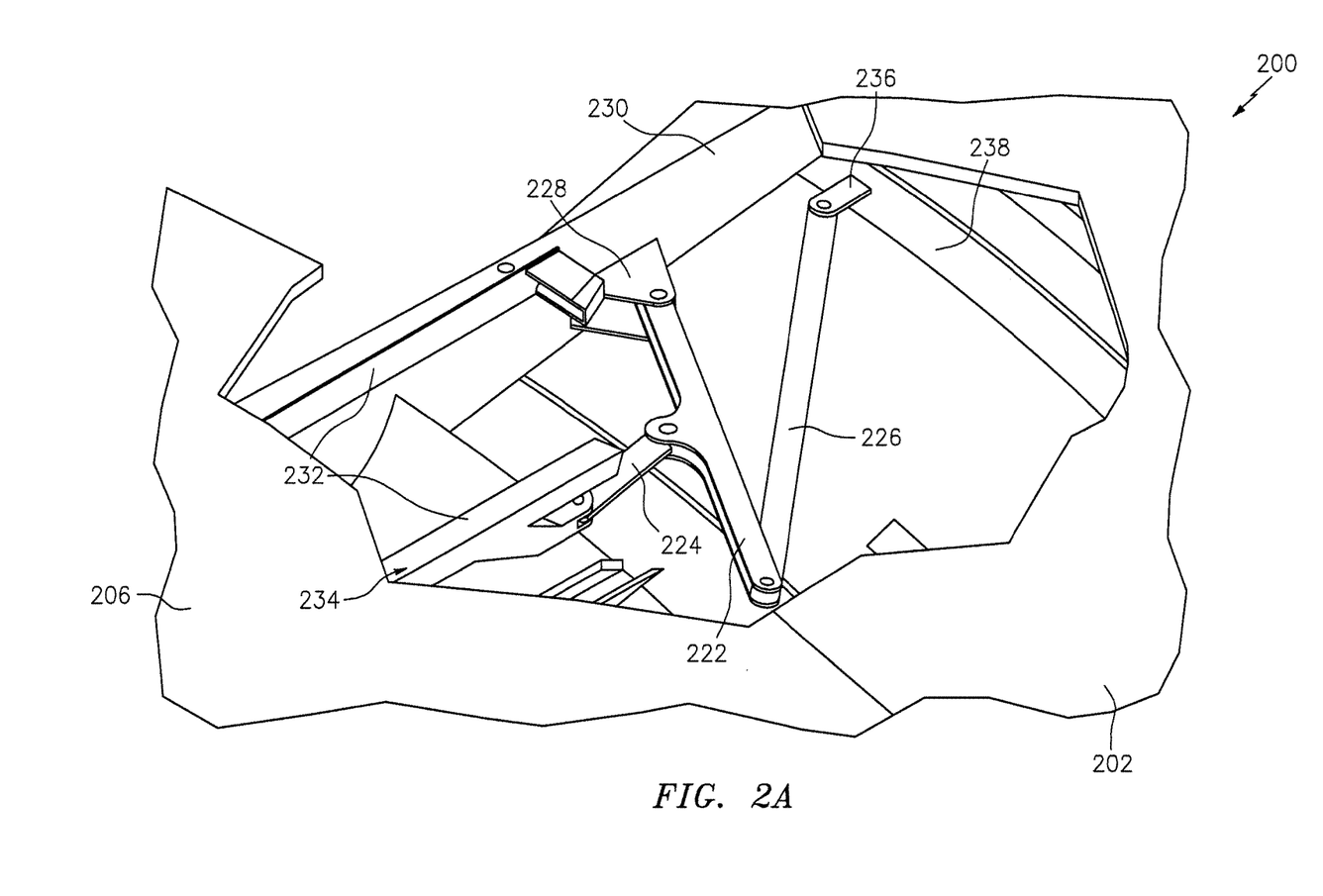
FIGS. 2A-2C illustrate a thrust reverser system incorporating aspects associated with a master-slave actuation/configuration for a plurality of sleeves.
Figure 2B:
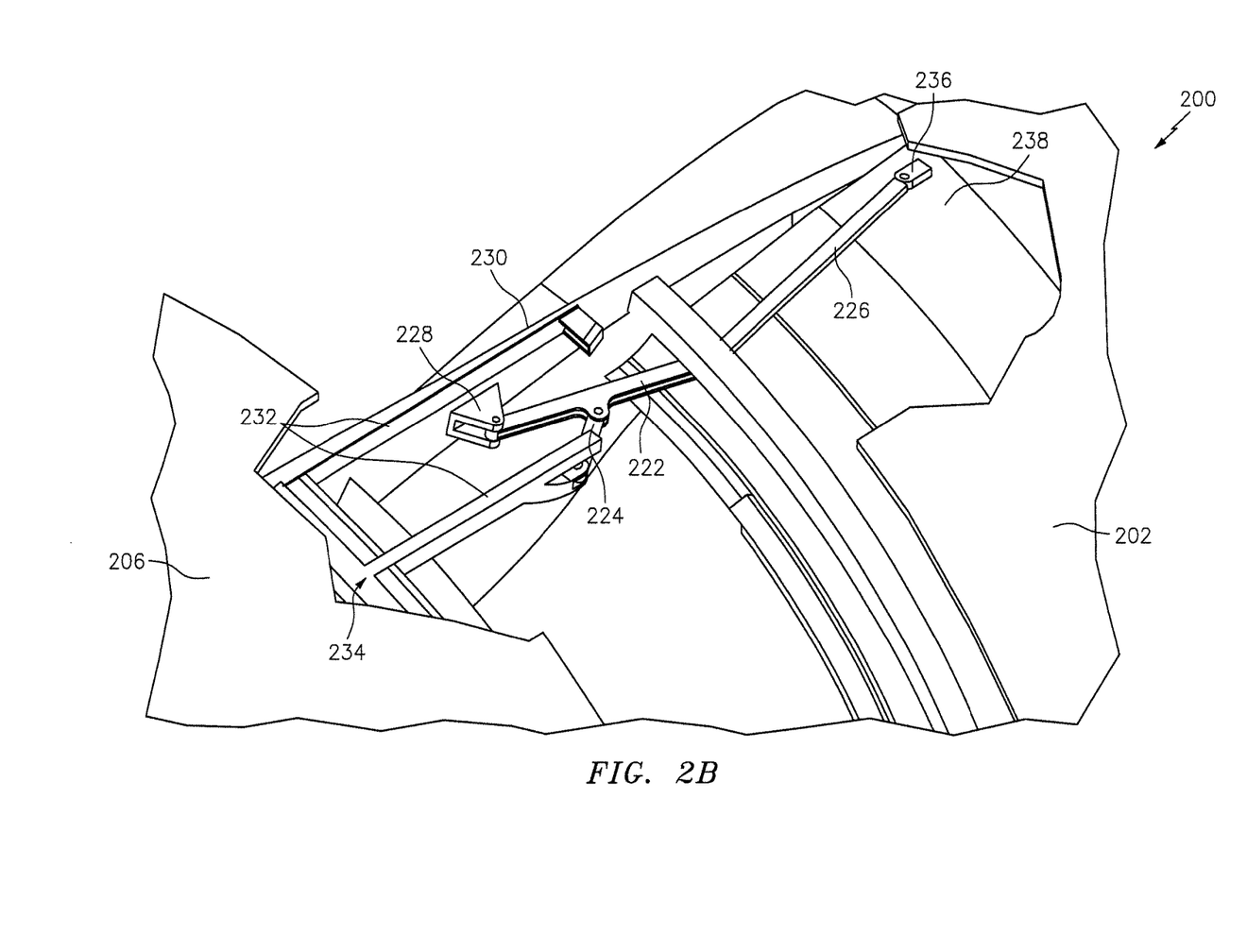
Figure 2C:
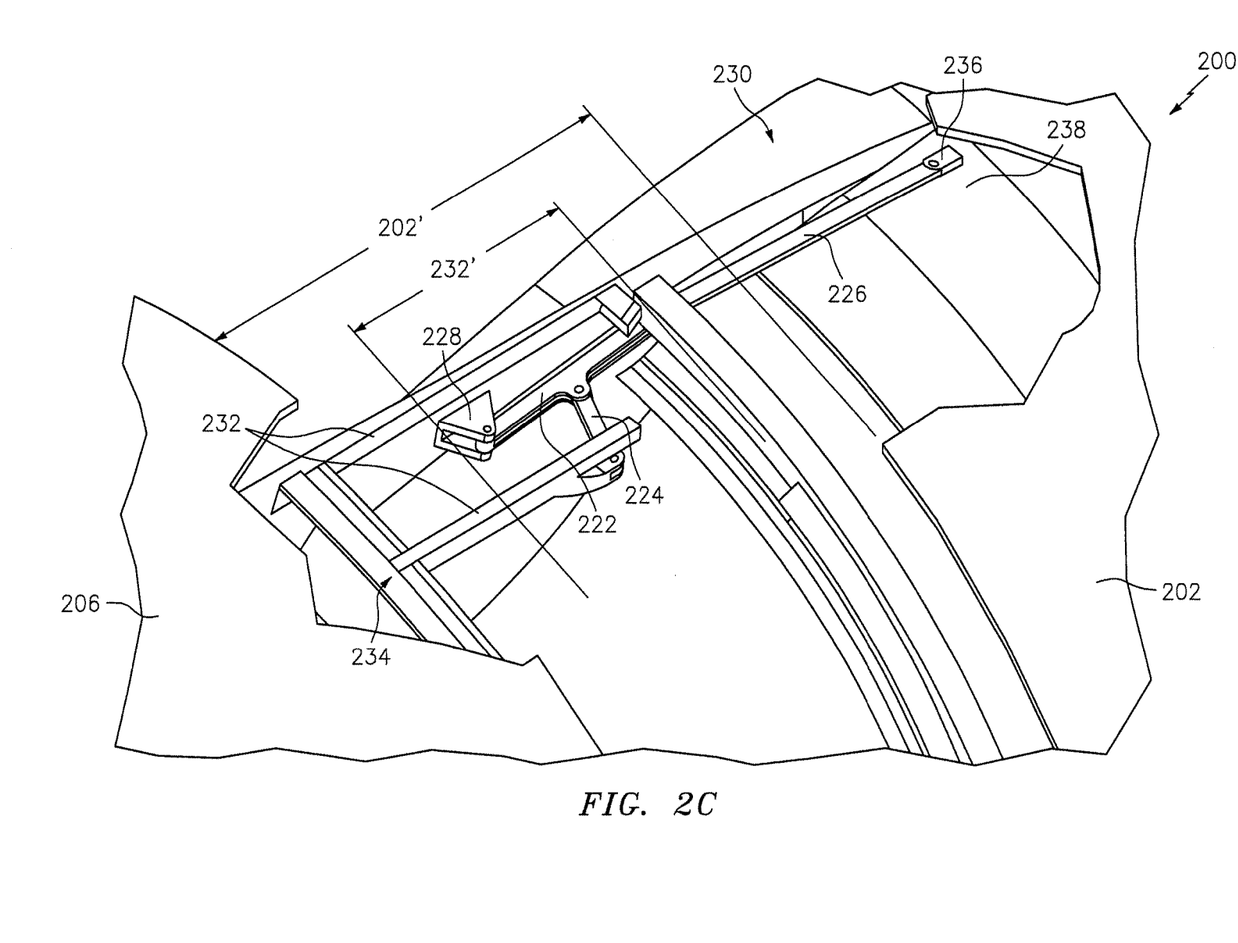

Referring to FIGS. 2A-2C, a system 200 is shown. The system 200 includes a number of components/devices that are described further below. The system 200 may be indicative of a portion of an overall thrust reverser system. For example, the system 200 may correspond to an upper portion of an overall thrust reverser system, such that a lower portion of the overall thrust reverser system may include analogous components/devices.

The system 200 includes a first link 222, a second link 224, and a third link 226. The first link 222 may be coupled to the second link 224. The first link 222 may be coupled to the third link 226.

The first link 222 may be coupled to a first clevis 228. For example, the first link 222 may be pivotally connected to the first clevis 228. The first clevis 228 may be coupled to a beam 230 which is thrust reverser fixed structure.

The second link 224 may be coupled to one or more translating cascades 232. A translating cascade 232 may also be referred to as a secondary sleeve. The translating cascades 232 may be configured to translate on a track and slider. The translating cascades 232 may be driven by a TRAS, which is not explicitly shown but is represented by reference character 234. The TRAS may constitute a hydraulic or pneumatic actuation cylinder, or a mechanical lead screw driven by a hydraulic, pneumatic or electric motor, or other options as will be recognized by those of ordinary skill in this art.

The third link 226 may be coupled to a second clevis 236. The second clevis 236 may be coupled to a bond panel 238 which forms part of the sleeve 202.

As shown, a sleeve 202 (which may be similar to the sleeve 102 of the system 100) and a structure 206 (which may correspond to the structure 106 of the system 100) are included as part of the system 200. The sleeve 202 may be referred to herein as a primary sleeve. The sleeve 202 may be configured to translate on a track and slider separate from the track and slide for the secondary sleeve including the cascade 232.

The system 200 may include a plurality of four-bar mechanisms. A first four-bar mechanism may include the translating cascades 232, the second link 224, the first link 222, and a first fixed structure (illustratively represented by one or more of the structure 206, the beam 230, and the first clevis 228). A second four-bar mechanism may include the first link 222, the third link 226, the sleeve 202, and the fixed structure (illustratively represented by one or more of the second clevis 236 and the bond panel 238). The four-bar mechanisms may be arranged in series with one another.

In the progression from FIG. 2A to FIG. 2B and from FIG. 2B to FIG. 2C, the translating cascades 232 transition from a stowed state (FIG. 2A), to a partially deployed state (FIG. 2B), to a deployed state (FIG. 2C), coinciding with a transition of the thrust reverser from a stowed state to a deployed state.

As shown in the progression associated with FIGS. 2A-2C, actuation of the translating cascades 232 may cause an actuation or movement of the sleeve 202. Accordingly, the system 200 may adhere to a master-slave type of configuration, where the translating cascades 232 play the role of a master mechanism and the sleeve 202 plays the role of a slave mechanism. In other embodiments, the roles may be reversed such that the sleeve 202 plays the role of the master mechanism and is directly actuated by a TRAS, and the translating cascades 232 play the role of the slave mechanism.

Superimposed in FIG. 2C is an illustration of a stroke 202' associated with the sleeve 202 relative to a stroke 232' associated with the translating cascades 232. As shown in FIG. 2C, the stroke 202' is different from the stroke 232'.

In terms of the movement of the sleeve 202 in FIGS. 2A-2C, the sleeve 202 may move a greater distance in transitioning from a stowed state (FIG. 2A) to a partially deployed state (FIG. 2B) than in transitioning from the partially deployed state to a fully deployed state (FIG. 2C). In other words, the ratio of the deployment rate of the sleeve 202 to the deployment rate of the cascade 232 or secondary sleeve may vary depending upon the deployment position of the thrust reverser as a result of the kinematic arrangement/mechanism of the system 200. Such features may be desirable, given that the translating cascades 232 will tend to experience the greatest loading when the thrust reverser is fully deployed. Also, such a movement of the sleeve 202 a greater distance at the outset of the thrust reverser deployment may facilitate the provisioning of room to support the deployment of a blocker door (not shown).

As described above, the system 200 may adhere to a master-slave configuration, wherein actuation of a first sleeve (e.g., translating cascades 232) may cause a movement or displacement of a second sleeve (e.g., sleeve 202). In other embodiments, an additional actuation input may be used in order to control the actuation of the translating cascades 232 and the sleeve 202. For example, referring to FIGS. 3A-3C, a system 300 that incorporates aspects of an additional input is shown. The system 300 includes an actuator 334 associated with the fixed structure 206 that is separate from the TRAS 234 associated with the translating cascades 232. The actuator 334 is coupled to a translating clevis 328 on the beam 230.

Figure 3A:
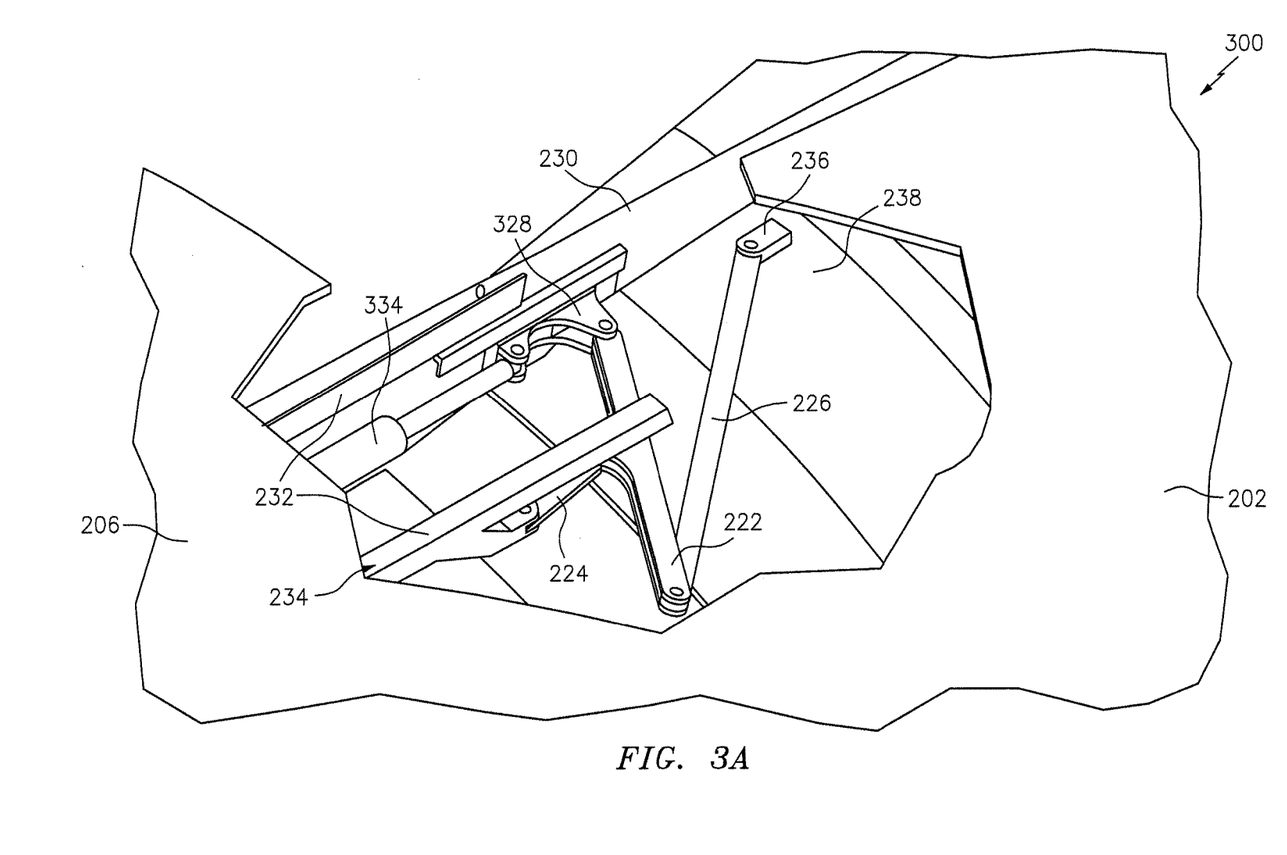
FIGS. 3A-3C illustrate a thrust reverser system incorporating aspects associated with separate/independent actuation for a plurality of sleeves.
Figure 3B:
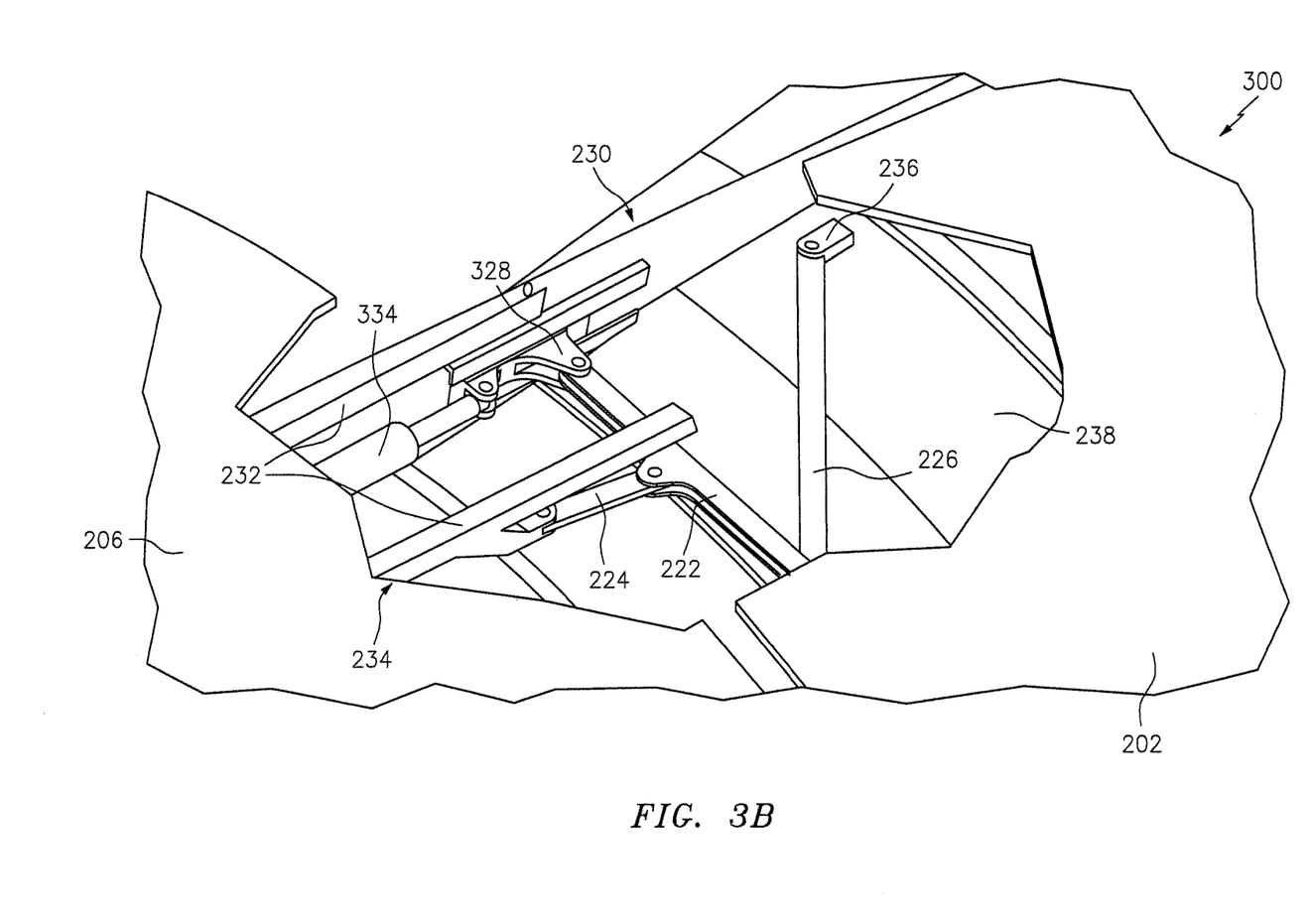
Figure 3C:
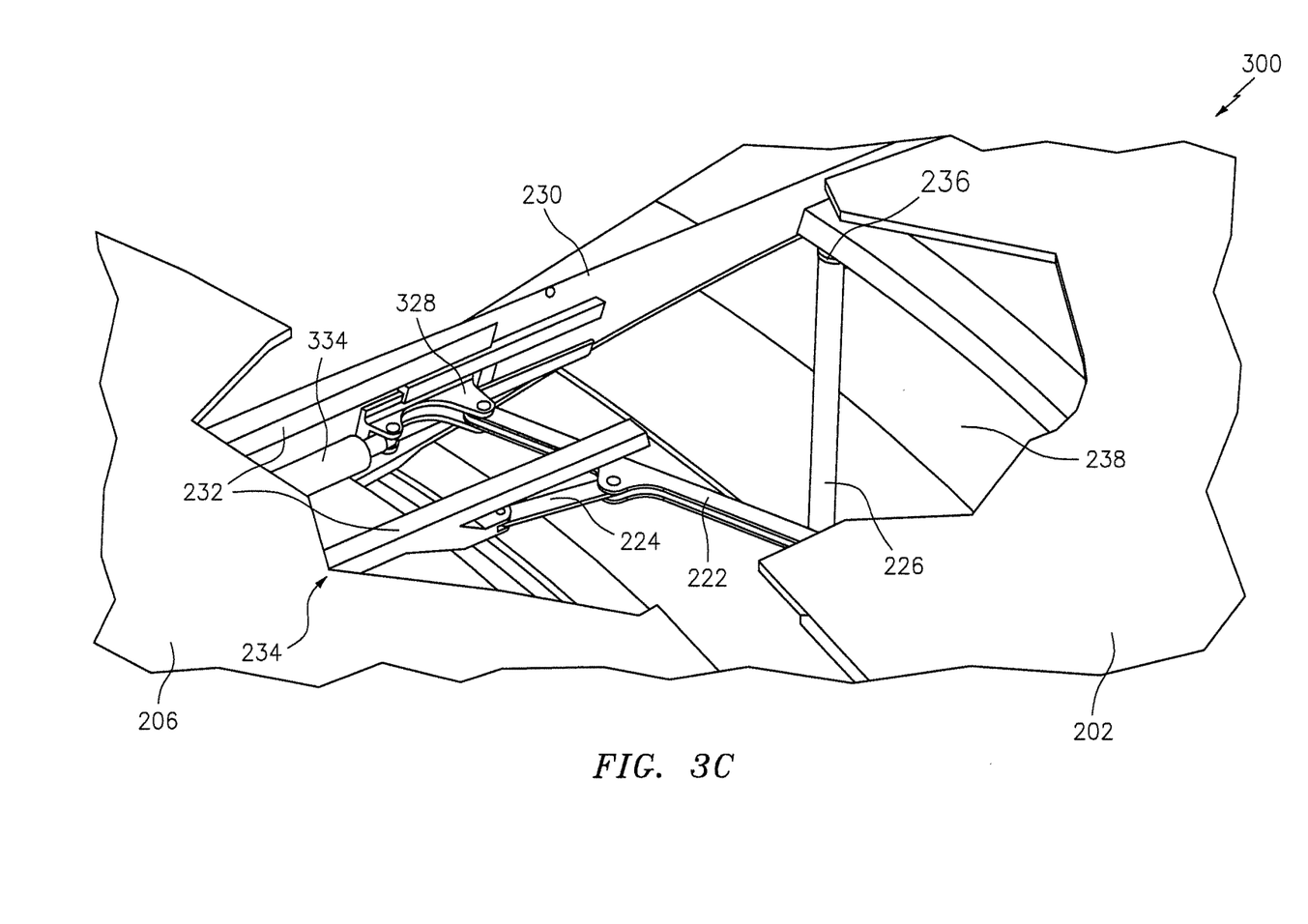

As shown in the progression from FIG. 3A to FIG. 3B and in the progression from FIG. 3B to FIG. 3C, the sleeve 202 is displaced/translated a given distance via the retraction of the actuator 334, while the translating cascades 232 have not been displaced. An internal lock in the TRAS 234 may keep the translating cascades 232 from moving. This sleeve motion due to the actuation of actuator 334 may be superimposed upon motion and actuation from the cascade 234 as previously described to produce a greater range of possible customization of the movement, stroke, and rate of the sleeve 202 compared to the cascade 234.

While some of the examples were described above in connection with a translating cascade reverser, one skilled in the art would appreciate that aspects of the disclosure may be applied in connection with any type of reverser, such as a secondary sleeve reverser and/or conventional reversers including those with fixed nozzles/trailing edges. The mechanism can be tailored for transient and deployed area match.

Technical effects and benefits of the disclosure include obtaining a maximum/increased efficiency in terms of engine operation/output by minimizing/reducing drag losses. Additionally, the size/profile of one or more components/devices (e.g., a translating sleeve) may be minimized/reduced, allowing for shorter lines of travel and better/different packaging options. For example, a shorter TRAS can be used for a given thrust reverser stroke. There might not be a need to penetrate an aft ring with TRAS actuator(s), allowing for tighter/smaller packaging.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

I claim:

1. A system for a thrust reverser of an aircraft comprising:
    a primary sleeve; and
    a secondary sleeve comprising a translating cascade,
    wherein an entirety of the translating cascade is configured to translate axially along a centerline of the thrust reverser,
    wherein the primary sleeve is coupled to the secondary sleeve via a plurality of four-bar mechanisms configured to pivotally move only in a common plane that is tangential to the primary sleeve or to the secondary sleeve, such that a first stroke associated with the primary sleeve is different from a second stroke associated with the secondary sleeve, and
    wherein the primary sleeve traverses a first distance associated with the first stroke at the outset of a deployment of the thrust reverser and a second distance associated with the first stroke at a later stage of the deployment.

2. The system of claim 1, wherein the first distance is greater than the second distance.

3. The system of claim 1, further comprising:
    at least one actuator configured to drive at least one of the primary sleeve and the secondary sleeve.

4. The system of claim 3, wherein the at least one actuator is configured to drive the secondary sleeve in order to cause an actuation of the primary sleeve.

5. The system of claim 1, wherein the plurality of four-bar mechanisms comprises:
    a first four-bar mechanism comprising:
    the secondary sleeve;
    a first link coupled to the second link;
    a second link coupled to the secondary sleeve; and
    a first fixed structure coupled to the first link;
    a second four-bar mechanism comprising:
    the first link;
    a third link coupled to the first link;
    a second fixed structure coupled to the third link; and
    the primary sleeve coupled to the second fixed structure.

6. The system of claim 5, wherein the first fixed structure comprises at least one of a clevis and a beam.

7. The system of claim 5, wherein the second fixed structure comprises at least one of a clevis and a bond panel.

8. The system of claim 3, wherein the at least one actuator comprises a first actuator configured to drive the primary sleeve and a second actuator that is configured to drive the secondary sleeve.

9. A system for an aircraft, comprising:
    a fixed beam;
    a translatable primary sleeve extending axially along and circumferentially about a centerline;
    a translatable secondary sleeve comprising a cascade and extending axially along and circumferentially about the centerline, wherein an entirety of the translatable secondary sleeve is configured to translate axially along the centerline;
    a clevis coupled to the fixed beam; and
    at least one link pivotally coupled to the clevis,
    wherein the at least one link couples the primary sleeve and the secondary sleeve and the at least one link is configured to pivotally move only within a plane that is tangential to the translatable secondary sleeve.

10. The system of claim 9, wherein the at least one link comprises a plurality of links.

11. The system of claim 9, further comprising a kinematic mechanism that includes the clevis and the at least one link, wherein the kinematic mechanism is configured to cause the primary sleeve to traverse a first distance at the outset of a deployment of the thrust reverser and a second distance at a later stage of the deployment.

12. The system of claim 9, further comprising:
    at least one actuator configured to drive at least one of the primary sleeve and the secondary sleeve.

13. The system of claim 12, wherein the at least one actuator is configured to drive the secondary sleeve in order to cause an actuation of the primary sleeve.

* * * * *